United States Patent [19]

Artzer

[11] 4,297,820

[45] Nov. 3, 1981

[54] COMPOSITE STRUCTURAL PANEL WITH MULTILAYERED REFLECTIVE CORE

[75] Inventor: Richard F. Artzer, Riverside, Calif.

[73] Assignee: Covington Brothers Technologies, Fullerton, Calif.

[21] Appl. No.: 89,564

[22] Filed: Oct. 29, 1979

Related U.S. Application Data

[63] Continuation-in-part of Ser. No. 857,235, Dec. 5, 1977, Pat. No. 4,226,067.

[51] Int. Cl.³ .............................................. E04C 2/26
[52] U.S. Cl. .............................. 52/309.11; 52/309.12; 52/410; 29/446
[58] Field of Search ................... 52/404, 309.4, 309.7, 52/309.11, 309.12, 223 R; 428/101, 223, 256; 29/446

[56] References Cited

U.S. PATENT DOCUMENTS

| | | |
|---|---|---|
| 427,914 | 5/1890 | Schillinger . |
| 978,002 | 12/1910 | Bruchartz . |
| 1,042,885 | 10/1912 | Budd et al. . |
| 1,234,244 | 7/1917 | Willsie . |
| 1,555,914 | 10/1925 | Denning . |
| 1,809,504 | 6/1931 | Carvel . |
| 1,831,897 | 11/1931 | Wagner . |
| 1,945,933 | 2/1934 | Chilowsky et al. . |
| 2,061,633 | 11/1936 | Muller . |
| 2,063,309 | 12/1936 | Graef . |
| 2,140,283 | 12/1938 | Faber . |
| 2,192,183 | 3/1940 | Deutsch . |
| 2,262,899 | 11/1941 | Mechlin . |
| 2,268,251 | 12/1941 | Haux . |
| 2,291,116 | 7/1942 | Streater . |
| 2,324,435 | 7/1943 | Smith . |
| 2,368,047 | 1/1945 | Southwick . |
| 2,522,116 | 9/1950 | Hayes . |
| 2,540,349 | 2/1951 | Reed . |
| 2,618,960 | 11/1952 | Orzel . |
| 2,718,138 | 9/1955 | Jones . |
| 2,744,042 | 5/1956 | Pace . |
| 2,831,232 | 4/1958 | Lawson . |
| 2,939,206 | 6/1960 | Keller . |
| 2,975,488 | 3/1961 | Bauner . |
| 3,000,144 | 9/1961 | Kitson . |
| 3,003,199 | 10/1961 | Talmey . |
| 3,010,493 | 11/1961 | Fingerut . |
| 3,082,486 | 3/1963 | Khawan et al. . |
| 3,091,998 | 6/1963 | Wehr et al. . |
| 3,093,935 | 6/1963 | Dunn . |
| 3,150,032 | 9/1964 | Rubenstein . |
| 3,157,144 | 11/1964 | DeJarnett . |
| 3,158,925 | 12/1964 | Edge . |
| 3,232,017 | 2/1966 | Pusinski . |
| 3,239,982 | 3/1966 | Nicosia . |
| 3,249,659 | 5/1966 | Voelker . |
| 3,264,165 | 8/1966 | Stickel ........................ 52/309.15 |
| 3,270,103 | 8/1966 | Kurtz . |
| 3,295,278 | 1/1967 | Muhm . |
| 3,305,991 | 2/1967 | Weismann . |
| 3,388,509 | 6/1968 | Mora . |
| 3,407,560 | 10/1968 | Baumann . |
| 3,435,567 | 4/1969 | Tyson . |
| 3,484,331 | 12/1969 | Betz . |
| 3,488,909 | 1/1970 | Bahr . |
| 3,494,088 | 2/1970 | Korner . |
| 3,522,685 | 8/1970 | Oroschakoff . |
| 3,555,131 | 1/1971 | Weismann . |
| 3,832,815 | 9/1974 | Balaz et al. . |
| 3,838,241 | 9/1974 | Weismann . |
| 3,879,908 | 4/1975 | Weismann . |
| 3,990,203 | 11/1976 | Greaves . |
| 4,079,560 | 3/1978 | Weismann . |
| 4,104,842 | 8/1978 | Rockstead . |

FOREIGN PATENT DOCUMENTS 10181 of 1927 Australia .
719238 10/1965 Canada .
866388 4/1961 United Kingdom .

Primary Examiner—John E. Murtagh
Attorney, Agent, or Firm—Gausewitz, Carr, Rothenberg & Edwards

[57] ABSTRACT

A modular lightweight structural panel is made of a lightweight, foil-faced expanded plastic filler reinforced by wire lattice structures. A number of long, narrow pre-coated filler elements are interleaved with a number of substantially flat lattice structures to form a laminated panel subassembly with corresponding reflective surfaces of the filler elements collectively forming substantially planar surfaces of the multilayered reflective panel core. The subassembly is laterally compressed, in a direction perpendicular to the planes of laminations, to thereby force each of the lattice structures to be pressed into and partially embedded in mutually contiguous surfaces and foil edges of adjacent ones of the filler elements. While in such compressed condition, a number of cross members are fixed to side portions of the several lattice structures that protrude beyond the panel surfaces to thereby hold the assembly in its pressed condition with the lattice structures embedded in the filler elements and the surfaces of adjacent filler elements in close physical contact with one another. The completed panel assembly is thereafter coated with a suitable mixture of concrete, plaster, or the like.

15 Claims, 9 Drawing Figures

COMPOSITE STRUCTURAL PANEL WITH MULTILAYERED REFLECTIVE CORE

This is a continuation-in-part of application Ser. No. 857,235, filed Dec. 5, 1977, now U.S. Pat. No. 4,226,067.

BACKGROUND OF THE INVENTION

1. Field of the Invention

The present invention relates to structural panels and more particularly concerns such panels and methods for their manufacture that employ filler materials, having certain desirable properties, together with reinforcing structures to provide a unitary panel structure.

2. Description of Prior Art

Lightweight plastic materials, including the many different types of foamed synthetic resins and expanded plastic foams, such as urethanes, polystyrenes, and the like, have a number of properties that are highly desired in building materials for various types of structures such as walls, roofs, and the like. These properties include light weight, exceedingly low thermal conductivity, resistance to abrasion, impermeability to moisture, and acoustic insulation. However, such materials generally are deficient in structural strength and, therefore, must be combined in some manner with other materials having satisfactory structural properties.

Various configurations employing combinations of lightweight cellular plastic foams or expanded plastic bodies and rigid load-bearing structural elements have been suggested in the past for providing structural building panels that can effectively utilize the desirable properties of the cellular materials. Typical of such prior art arrangements are the U.S. patents to Weisman U.S. Pat. Nos. 3,305,991, 3,555,131 and 3,879,908. In U.S. Pat. Nos. 3,305,991 and 3,555,131, there is described a structural panel and a technique for manufacture thereof in which a three-dimensional reinforcing framework is first built up and then a lightweight plastic core is formed in situ within the framework, and positioned so that the outer surfaces of the resulting foamed in place core are hopefully located inwardly of the outer boundaries of the three-dimensional framework. It is desired to have the framework extend outwardly of the core so that the hybrid panel, the combination of cellular material and rigid framework, may be coated with plaster, gunnite, stucco or the like, in which the projecting portions of the structural framework may be embedded. However, because the cellular material is foamed in place, a form must be provided to define the bottom surface of the foam core. Since this form must be positioned above one outer side of the prefabricated structural framework, difficulties are encountered in maintaining the form in a planar configuration and in positioning the form at a precise distance from the outer surface of the framework.

Further, since no form is generally employed to define the upper surface of the foamed in place core (the panel core is foamed in place within the structural framework, with the panel in a horizontal position according to the teaching of the patents), the foam core will exhibit an outer surface that is far from the desired planar condition. It will exhibit a surface of such irregularity and imprecise location that the foam core may actually contact the outer elements of the structural framework in many places, thereby preventing a subsequent coating from completely encompassing such outer portions of the framework.

The later patent to Weisman U.S. Pat. No. 3,879,908 avoids some problems of the use of foamed in place material and instead, after building a completed three-dimensional structural framework that covers the entire panel on all six sides thereof, inserts a plurality of insulative elements through passages that are disposed wholly within the structural framework. These insulative elements must be dimensioned so as to freely and easily pass between adjacent elements of the structural framework and, when positioned, will not have adjacent surfaces in contact with one another. Impermeability to moisture is thereby greatly degraded. Thereafter a bonding agent is employed in the arrangement of the Weisman U.S. Pat. No. 3,879,908 to secure the insulative elements in position within the lattice. This bonding agent is a layer of material that is foamed in place, but in a somewhat thinner layer than the remainder of the core, and is employed to bond the insulative elements to the metal elements of the structural framework. This is a time-consuming and expensive procedure, and still provides a panel surface formed by a foamed in place bonding agent. Such surface may be irregular and improperly positioned with respect to the outer surface of the structural framework. Further, since the insulative elements must be inherently spaced from one another in order to allow them to be inserted into the passages in the structural framework, they can form no vapor or moisture barrier. Their heat and sound insulating properties also are significantly degraded by virtue of the space between adjacent insulating elements, even though the ends of such spaces are covered by the foamed in place bonding agent.

Because of its extremely low thermal conductivity, foamed urethane is potentially a particularly desirable core material. However, it is subject to deterioration in the form of crumbling when exposed to air and light for extended periods. In the manufacture and use of structural panels such as those described above, such prolonged exposure frequently occurs during lengthy storage periods between fabrication and installation of the panels. The deterioration of the urethane core material is substantially accelerated by the common practice of storing the completed panels outdoors where they are directly exposed to the elements while they await shipment to the job site and installation of their protective layers of plaster, stucco or the like. For this reason it has, in the past, proven more practical to form the panel cores from materials (such as polystyrene) which are much less subject to such deterioration—despite their higher thermal conductivities.

Yet another problem exists in the panel construction techniques disclosed in the Weisman patents. Both the foamed in place method and the element insertion and bonding method preclude, as a practical matter, the addition of foil facing to the opposite side of the expanded plastic core—either before or after the core is formed or placed within its supporting lattice structure. Such facing is a common and desirable addition to sheets of expanded plastic insulating material used without supporting lattice structures in that it provides reflective barriers to radiant heat transfer through the insulation and adds two more layers of moisture impermeable material to the sheet. In the case of urethane insulation, the foil facing (since it leaves only the edges of the sheet exposed) additionally affords significant protection from deterioration during extended exposure to light and air.

In the foamed in place method taught by Weisman, it is readily apparent that the addition of foil facing to the panel core is neither economically or practically feasible—both because of the interfering lattice structure and the resulting irregular surface of the expanded plastic itself. Moreover, in the element insertion and bonding method, the application of foil facing to the elements (prior to or subsequent their insertion in the lattice structure) would greatly hinder, if not preclude, the addition of the necessary bonding agent to the elements.

Accordingly, it is an object of the present invention to provide a composite structural panel that avoids or minimizes above-mentioned and other problems.

SUMMARY OF THE INVENTION

In carrying out principles of the present invention in accordance with a preferred embodiment thereof, a plurality of elongated pre-coated filler elements and a plurality of substantially flat lattice structures are interdigitated, in consecutive alternation, and then laterally pressed against one another to forcibly embed the lattice structures in the filler elements. While holding such interdigitated structures and elements in laterally pressed condition, the lattice structures are fixedly secured to one another. A reinforced panel embodying principles of the present invention comprises a multilayered reflective core held in place within a supporting matrix. The core includes a plurality of contiguous elongated filler members, mutually contiguous ones of the filler members having opposed surfaces pressed against one another in vapor tight face-to-face contact with each other and opposite side surfaces extending from the contacting surfaces. A plurality of reflective vapor impervious membrane strips are each fastened to and cover or coat substantially the entire extent of one of the opposite side surfaces of the filler members. Mutually adjacent ones of the reflective strips have lateral edges in edge-to-edge contact and collectively define a substantially continuous reflective and vapor resistant layer or coating on at least one side surface of the core. The supporting matrix includes a plurality of lattice structures, each being interposed between and pressed into adjacent edges of a pair of the reflective strips and a pair of mutually opposed filler member surfaces. Transverse matrix members extend across the filler members and across the core, each of the transverse members being fixed to at least a group of lattice structures to complete the supporting matrix and thereby hold the lattice structures and filler members pressed together in a unitary panel configuration.

DETAILED DESCRIPTION

Figures 1, 2, 3:
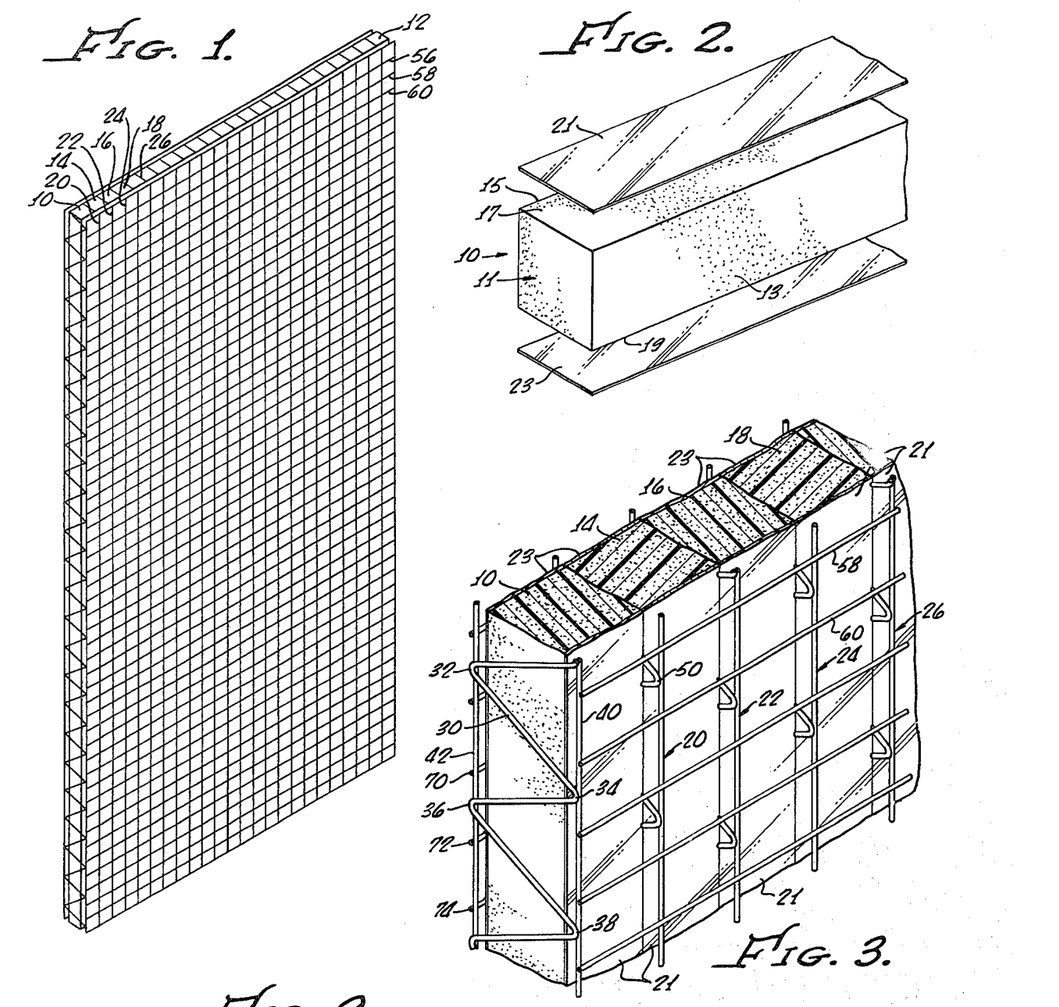
FIG. 1 is a perspective view of a structural panel embodying principles of the present invention.
FIG. 2 is an enlarged, exploded perspective view of a part of a single filler element of the panel of FIG. 1.
FIG. 3 is a fragmentary pictorial view, to a larger scale, or a portion of the panel of FIG. 1.

As shown in FIG. 1, a combined foil-faced foam and wire reinforced structural panel embodying principles of the present invention includes a plurality of elongated filler elements, including end elements 10 and 12 and a plurality of intermediate elements, including elements 14, 16, 18 etc., interposed between the end elements and all having their adjacent surfaces in substantially complete face-to-face contact except for certain points to be described hereinafter.

In a presently preferred form, each filler element (see FIG. 2 in which the representative end element 10 is illustrated) comprises an elongated urethane filler member 11 having opposite side surfaces 13 and 15, and opposite front and rear surfaces 17 and 19. Bonded to the front and rear surfaces 17 and 19, and extending along their lengths and widths, are reflective membranes in the form of thin metallic foil strips 21 and 23. Although aluminum foil is presently preferred as the precoating, it will be understood that other metallic and nonmetallic membranes or very thin reflective and impervious materials may be used instead.

Each foil-faced filler element has a length equal to the length of the panel which, for a common panel size, is eight feet, and has a thickness, as measured in the direction of the panel thickness, of two inches, and a width, as measured in the direction of the width of the panel, of two inches. The cross-section of each filler element of a preferred embodiment is substantially square and each face of the filler element is planar and at right angles to a pair of adjacent faces. Thus, in assembled condition, with the filler elements aligned with one another, as illustrated in FIG. 1, corresponding faces, such as the front and rear surfaces of the filler members 11, and the outer surfaces of the foil strips 21 and 23, lie on a common surface which is illustrated as being planar, although other than planar surface configurations may be employed. It is presently preferred to employ twentyfour two-inch filler elements for a panel, thereby to provide a panel about four feet wide.

Figure 9:
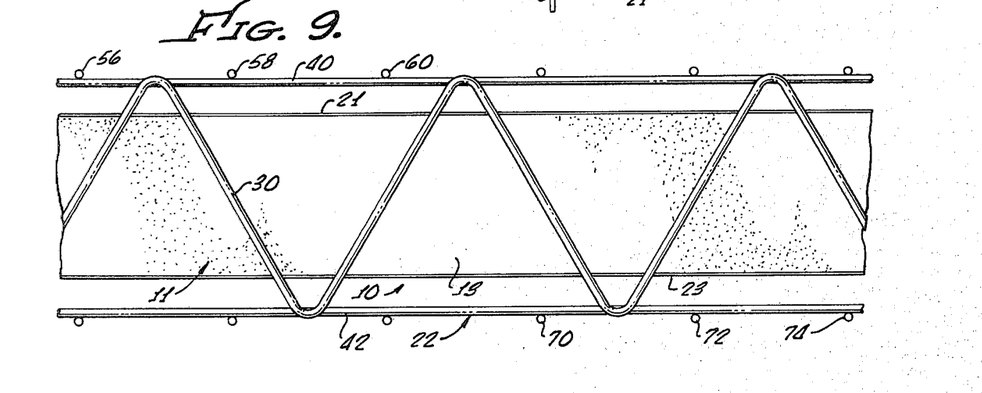
FIG. 9 is a side view of a portion of the completed panel.

Interposed between filler elements of each adjacent pair of filler elements are rigid lattice structures, typical ones of which are designated at 20, 22, 24, and 26. The lattice structures are substantially planar or, in effect, two-dimensional, and have a depth greater than the thickness of any one of the filler elements so that outer side portions of each of the elongated lattice structures project beyond the common panel surface defined collectively by the adjacent filler elements, as best seen in FIGS. 3 and 9.

Each lattice structure is identical to each other lattice structure and, as illustrated in FIG. 3, each is formed of a relatively rigid sinuously bent wire 30 having a zig-zag configuration that defines alternate apices such as those indicated at 32, 34, 36, and 38. Fixed to the sinuous rod 30, as by welding for example, is a pair of mutually spaced parallel side rods or wires 40, 42 that are spot welded to the sinuous rod 30 at the apices on respectively opposite sides thereof, at apices 34, 38, etc., for rod 40 and at apices 32, 36 for rod 42. Thus, a rigid planar or substantially two-dimensional lattice structure is provided. The depth of the lattice structure, that is, the shortest distance between side rods 40 and 42, is not less than and is preferably greater than the thickness of the filler elements 10–18, etc. For example, where the filler elements have a thickness of two inches, a preferable depth of the lattice is three inches and each side bar of a lattice is positioned above the common surface collectively defined by the several filler elements at a distance of approximately one-half inch.

Figure 4:
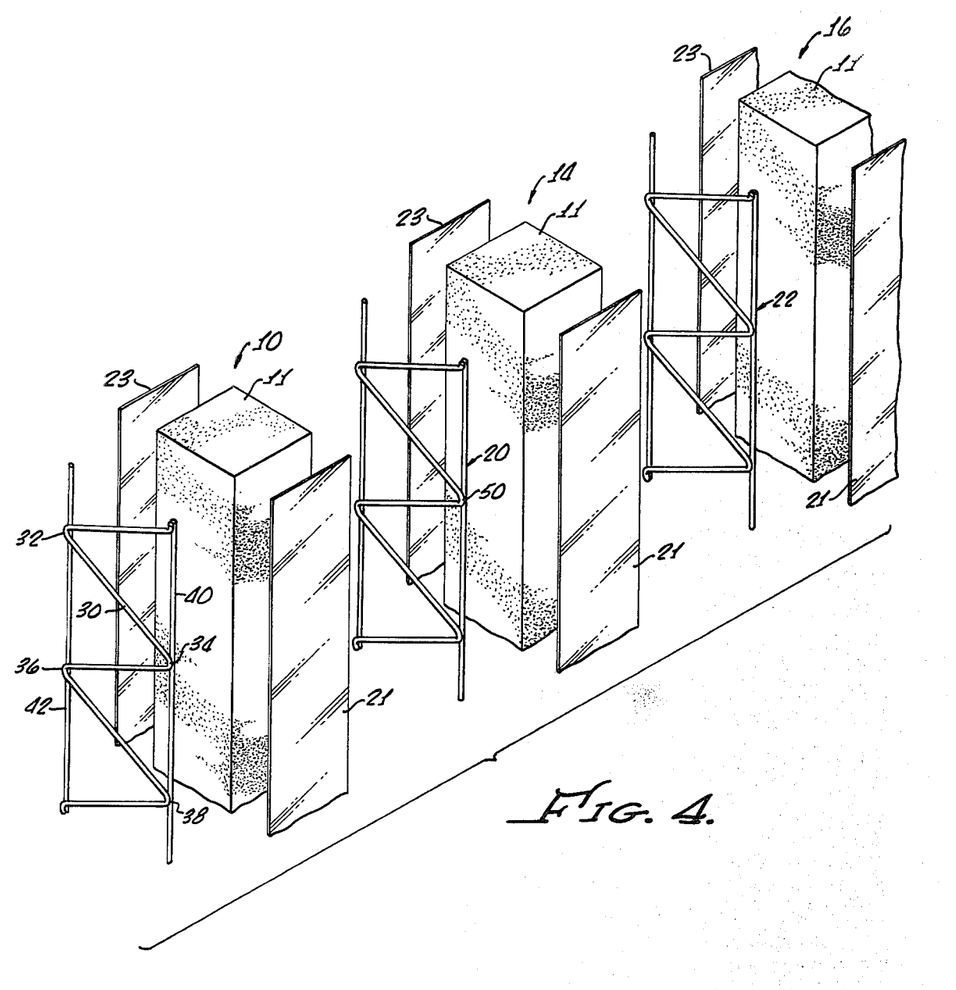
FIG. 4 is an exploded view of part of the panel portion of FIG. 3.

Although the several lattice structures may be positioned relative to one another along the eight-foot length of the four foot by eight foot panel in any number of different positions, the corresponding apices of adjacent lattice structures, such as apex 34 and the corresponding apex 50 of the adjacent lattice structure (FIGS. 3 and 4) may be staggered longitudinally of the panel relative to one another or they may be aligned if necessary or desirable. The alternate or staggered configuration, shown in FIG. 3, is presently preferred since this arrangement will provide greater reinforcement for edges of a portion of the panel that has been severed. Thus, when it is desired or necessary to cut a portion of the completed four foot by eight foot panel, different ones of the lattice structures will have their severed portions at different distances from the outer panel surfaces, if the lattice structures are staggered so that the corresponding apices are not aligned across the width of the panel.

It is important to note that the panel components are held together by the connection of the several lattice structures to one another. This is achieved by a plurality of longitudinally spaced cross rods, such as rods 56, 58, 60 and corresponding rods similarly spaced and positioned along the length of the panel. Each rod is fixed as by spot welding, for example, to a side rod such as side rod 40, of each of the lattice structures. A plurality of longitudinally spaced cross rods, substantially identical to the rods 58, 60, etc., on one side of the panel, is provided on the other side of the panel, all of such additional plurality of cross rods being fixed, as by spot welding for example, to the second side rods 42 at the other side of each of the lattice structures. Thus a rigid unitary three-dimensional skeletal framework or supporting matrix is provided by means of the relatively rigid truss-like lattice structures 20, 22, 24, 26, etc., which are rigidly interconnected to each other in laterally spaced relation by means of the cross rods 58, 60, etc., on one side of the array of lattice structures and by similar cross rods such as 70, 72, 74 (FIG. 9), on the other side of the lattice structures, on the other side of the panel.

The filler elements in the assembled panel have contiguous surfaces, adjacent faces (i.e., the side surfaces of the filler elements 11) being in direct planar physical contact with each other, thereby to provide a continuity of heat and sound barriers and insulation afforded by the filler material itself. Additionally, the side edges of the substantially coplanar foil strips are closely adjacent one another in the assembled panel. No bonding agent is needed to secure the filler elements to one another, and, although a bonding agent may be employed if deemed necessary or desirable, the components are suitably held together by virtue of the assembly techniques that now will be described.

In manufacture of the described panel, the filler elements 10 through 18, etc., are first formed, each being identical to each other in a preferred embodiment, although they may be made of various widths if deemed necessary or desirable. Conveniently, the eight feet by two inches by two inches filler elements are cut with a multibladed saw or the like from sheets of eight feet by two feet by two inches solid rigid urethane foam to whose front and rear surfaces continuous sheets of the foil facing have been bonded prior to such cutting. Alternatively, the filler elements may be cut from other sizes of sheets or formed other than by cutting, as by directly molding the individual filler members, for example. Also, if desired, foil strips may be applied directly to precut foam strips. In any case, the foam strips are precoated, that is, the foil strips are secured to the foam strips before assembly or even subassembly of the foam and lattice structures.

Figure 5:
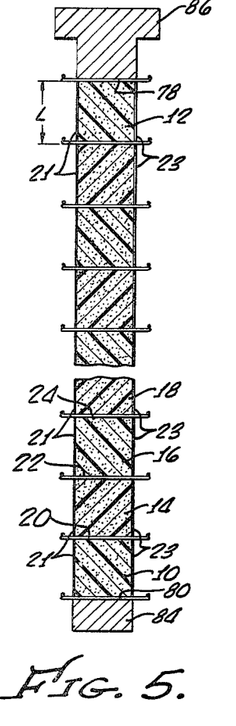
FIG. 5 illustrates a subassembly of the panel of FIG. 1, in partly assembled condition, prior to lateral compression.

Each of the substantially two-dimensional lattice structures is made, each comprising a sinuous rod 30 and a pair of side rods 40 and 42 fixed thereto. All the lattice structures and filler elements are made or cut to the same length, which is eight feet for the illustrated four-foot by eight-foot panel, and then a number of filler elements and lattice structures are interdigitated with one another and stacked vertically (with the stack resting on a side edge of the panel subassembly) in a panel subassembly substantially as shown in FIG. 5, with the foil faces of the filler members being aligned on opposite sides of the stack. The subassembly of FIG. 5 includes a pair of top and bottom or outer lattice structures 78, 80, the previously described outermost filler elements 10 and 12, and additional filler elements and lattice structures positioned in consecutive alternation. Where a panel of four feet in width is made, using filler elements of two inches in width and lattice structures of a thickness of approximately 0.08 inches, the preassembly stack, as illustrated in FIG. 5, will include 24 filler elements providing a total of 48 inches of filler elements and 25 lattice structures since there is one lattice structure for each filler element and one additional lattice structure on the end of the stack. Since 25 lattice structures have a collective thickness of two inches, the total height of the preassembly vertical stack, as illustrated in FIG. 5, is 48 inches plus 2 inches, or 50 inches.

In the preassembly condition of FIG. 5, before vertical compressive force is applied, mutually facing sides of adjacent lattice structures are spaced apart by a distance L that is not less than (actually equal to) the lateral dimension between opposite (top and bottom, as viewed in FIG. 5) side surfaces 13 and 15 of the interposed filler elements, such dimension being two inches in the exemplary embodiment described herein. In other words, the lattice structures merely touch but do not penetrate the contiguous surfaces of adjacent filler elements, and such surfaces are mutually spaced at this time, by the thickness of the interposed lattice structure.

Figures 6, 8:
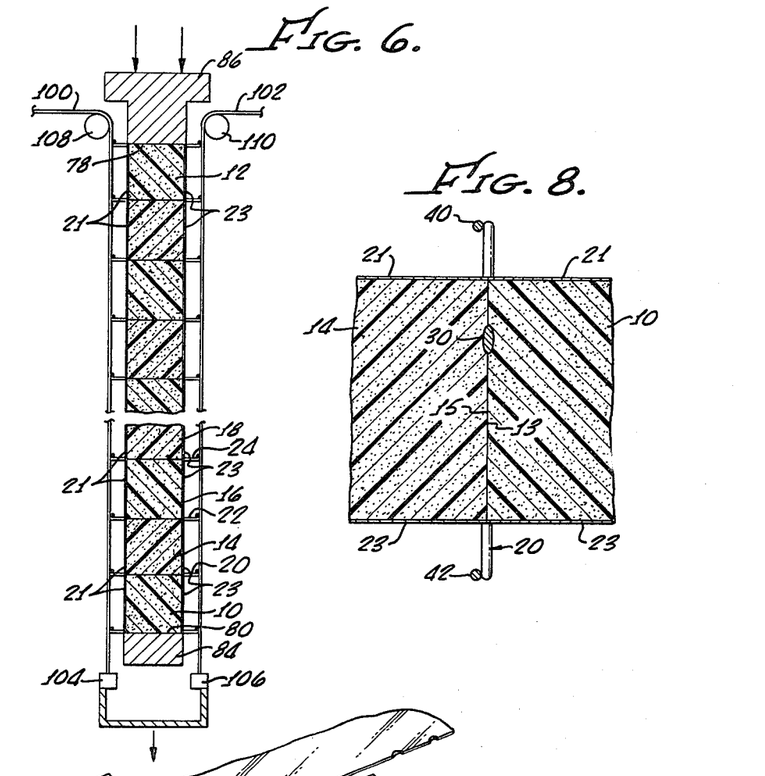
FIG. 6 illustrates positioning of the cross wires adjacent opposite sides of the compressed subassembly of filler elements and interposed lattice structures.
FIG. 8 is a fragmentary sectional view illustrating the face-to-face content of adjacent filler elements and an interposed portion of a lattice structure.
Figure 7:
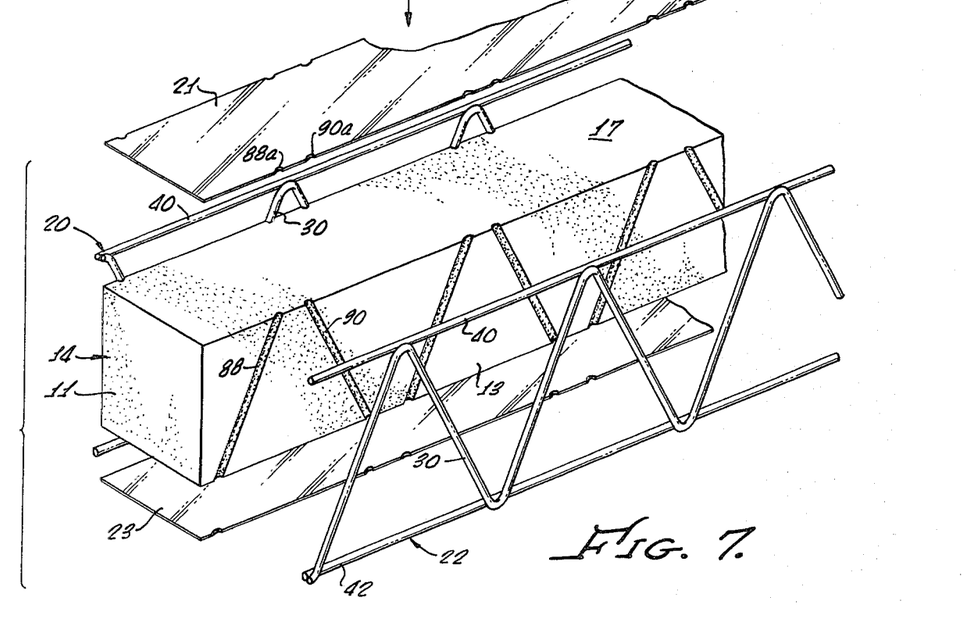
FIG. 7 is a partially exploded perspective view illustrating the relation of lattice structures and filler elements of the finished panel.

The stack is now vertically compressed between a fixed lower support 84 and a movable upper pressure arm 86. The compression drives the relatively slender narrow rods or wires of the lattice structures into the adjacent side surfaces of the filler members 11 and into the adjacent side edges of their foil strips 21 and 23 whereby such side surfaces and edges are deformed along the lines of contact with the lattice structures to provide pressed grooves, such as grooves 88 and 90 (FIG. 7) in the filler members 11 and corresponding indentations 88a, 90a in the side edges of the foil strips 21 and 23. The pressure is not great enough to significantly change the dimension of any of the filler elements. As a corollary to the forming of the pressure grooves 88, 90, and the foil side edge indentations 88a, 90a in the filler elements, the lattice structures are pressed into the lateral surfaces such as surface 13 of the filler elements and the foil edges and partly embedded therein, as illustrated in FIGS. 7 and 8. It is only the sinuous rod 30 of the lattice structures and not the side rods 40 and 42 that are pressed into the filler elements since the side rods 40 and 42 are fixed to the sinuous rod apices and these apices, together with the sides rods, are positioned outwardly of the common surface collectively formed by the outer faces of the several filler elements.

The preassembly stack, illustrated in FIG. 5, is compressed through a distance equal to the total thickness of the twenty-five lattice structures, namely, a distance of two inches in the illustrated arrangement where twenty-five lattice structures of 0.08 inches each is employed. Rigidity and compressive strength of the lattice structures, which are formed of a steel wire for example, are so much greater than similar properties of the filler material, which are preferably made of an expanded urethane, that no compression of the lattice structure occurs during the compression of a preassembly stack. All of the stack compression occurs in the several filler elements and this is achieved only via the formation of the previously described side grooves and edge indentations. The compression is such as to fully and completely embed portions of the several diagonal arms of the sinuous rods in a pair of mating grooves and foil edge indentations of mutually facing opposed lateral surfaces of adjacent filler elements (except for end lattice structures 78 and 80 which may have outer portions thereof slightly exposed.)

The compression of the subassembly forces the filler elements into a mutually contiguous relation, that is, a relation in which facing surfaces of adjacent filler elements are in close and intimate physical contact with each other substantially throughout the entire area of such facing surfaces, except for these portions at the several grooves and side edge indentations that are separated by the interposed sections of the sinuous rod of the lattice structure. In this final position of filler elements and lattice structures the distance between mutually facing sides of adjacent lattice structures is less than the distance between opposite lateral faces of filler elements interposed therebetween.

With the subassembly stack maintained in its laterally compressed condition (vertically compressed with the stack lying on its side, as viewed in FIGS. 5 and 6), wires to provide a pair of side or cross members, such as wires 100, 102 (FIG. 6), are firmly grasped in clamps 104, 106, being drawn over guides 108, 110 from wire rolls (not shown). The wire rolls are restrained to restrain further unrolling of wire and the clamps 104, 196 are pulled downwardly, as indicated by the arrow in FIG. 6, to thereby tension the wires 100, 102. The tension straightens the wires and positions them closely adjacent and in contact with the side rods of the several lattice structures of the now compressed preassembly stack. Now, while the preassembly stack is maintained in the compressed condition previously described and the cross wires 100, 102, are held in the described position, the latter are spot welded to each of the lattice structure side rods at each point of contact between a cross rod and a side rod. A plurality of such cross wires are employed on each side of the panel, as can be seen in FIGS. 1 and 2. After welding, the cross wires are severed at points adjacent the end lattice structures, and the stack is released from the compression of members 84, 86.

The stack of interdigitated filler elements and lattice structures now forms a laterally laminated unitary panel structure, having a multilayered core, rigidly combining a number of filler elements all in close face-to-face contact with one another, a number of rigid reinforcing lattice structures and additional rigid reinforcing cross rods that tie all of the components together in a unitary configuration. All but the end lattice structures are completely embedded in the filler elements. The interaction of the embedded lattice structures and the pressed grooves in contiguous surfaces of the filler elements provide a locking interengagement that helps to rigidify the assembly and to hold the parts together. The lattice structures, in effect, are keys that resist relative sliding of the contiguous filler elements. No bonding agents are needed nor employed to hold adjacent filler elements in their mutually contiguous arrangement, and yet the close and tight contact between adjacent filler elements provides an excellent barrier to vapor, liquid, heat and sound. The filler elements and lattice structures, by virtue of their close and intimate relationship, and by virtue of their face-to-face contact provide a strength of the assembled panel that is greater than the sum of the strengths of the individual elements. The filler elements not only support each other physically and structurally, but provide lateral support for the interposed lattice structures, thus greatly increasing load bearing capabilities. The assembly is readily made and the parts are inexpensive.

Surprisingly and unexpectedly, the described method provides a reinforced panel having a multilayered, foil coated plastic core contained completely within a three-dimensional wire matrix and provides a substantially continuous core having reflective surfaces spaced inwardly of the major panel surfaces.

When the preassembly stack is made, the outer foil surfaces of the several square cross-section filler elements are readily aligned with one another to form common planar surfaces on each side of the subassembly, providing a substantially continuous reflective and vapor impervious surface. Moreover, the filler elements are readily and accurately positioned relative to the lattice structures. The latter are also readily aligned and positioned relative to one another so that their outermost portions, namely, the apices of sinuous rods and the side rods thereof, are all positioned in common planes and at precisely controlled and predetermined distances outwardly of the common planar surfaces formed by the outer sides of the filler elements. Repeatability and precision of dimensions and relative positioning of the assembly parts are readily obtained and controlled.

The completed panel may be employed in various types of structures such as walls, floors, roofs, and the like, or other similar assemblies, by suitably positioning a number of the panels (i.e., in a side edge-to-side edge relationship), holding them in a desired configuration or subassembly by means of temporarily wiring or tying several panels to one another, and thereafter spray coating the aligned opposite sides of the panels in the subassembly with a suitable fluid mixture of concrete, gunnite, plaster, or the like. Such fluid mixture may be generally designated as a "cement plaster" coating.

Techniques for employing such panels in various types of structures are known to those skilled in the art and no further details thereof need be disclosed herein. However, it should be noted that the described panel and the method of manufacture thereof facilitates precision construction and coating because of the great precision of the panel configuration. The described panels have precise and substantially planar filler element surfaces and a precise, and carefully and uniformly positioned (relative to the filler elements) structural framework. There is little or no danger of improper positioning of filler elements which will not protrude outwardly of the outer sides of the lattice structure as is often the case where the panel core is foamed in place. Further, since no bonding agents are employed to hold the adjacent filler elements in this previously described vapor tight contiguous relationship and the multilayered panel core is comprised of a number of separate filler elements merely held against one another but otherwise unconnected, various portions of one or more of the filler elements may be readily severed and removed from the panel if it is necessary to provide holes through the panel.

The completed 4'×8'×2" panel is strong and rigid, but extremely lightweight and may be readily handled by one man, yet it provides the desirable qualities of strength, heat insulation, sound insulation, a vapor barrier, and ready adaptability to coating and securing to other panels and other structures. The panel may readily be made in other dimensions, if desired, or in other than planar configurations.

As previously mentioned, an expanded urethane cellular material is currently preferred for manufacture of the filler members. This is because it has a very high thermal resistance or "R" value. Such "R" value is the reciprocal of an insulating material's thermal conductivity (i.e., its "U" value which is typically expressed in units of Btu/hr./sq.ft./°F.) and is thus a direct measure of such material's thermal insulating effectiveness compared to another material having an equal thickness through which heat flows. As an example, for equal thicknesses and temperature differences across such thicknesses, a material having an "R" value of 10 will allow twice as much heat flow through it in a given time period as will a material having an "R" value of 20.

In the construction of new building exterior walls, the minimum allowable "R" value of the composite walls (i.e., including its insulation) is frequently specified in local building codes. A typical minimum wall "R" value for such walls is 11. This insulation criteria can be met in typical two-inch by four-inch wood frame wall construction by placing conventional fibrous insulation blankets (or "batts") between the vertical studs during construction of the walls. However, an increasing number of building codes have been or are being revised to require a minimum wall "R" value on the order of 19. To meet this standard with conventional wood frame and batt insulation construction requires the use of two-inch by six-inch studs and six-inch thick blanket insulation or completely sheathing a standard 2"×4" stud wall insulative batt construction with added layers of insulation material, thus significantly increasing conventional wall construction costs—costs which are already greatly higher than those associated with the use of prefabricated panels (having nonfoil-faced polystyrene cores) of the type described herein. Significantly, by using the two-inch thick multilayered foil and urethane core of the present invention, this much higher insulation requirement may be met with no increase in wall thickness, the finished wall having a minimum "R" value of 19.

It should be noted that in conventional wood frame and fibrous insulation wall construction the insulation is not continuous across the horizontal extent of the finished wall. It is of necessity interrupted by the vertically extending wooden studs themselves which, for structural reasons, must be spaced fairly close to each other. As an example, nominal 2"×4" wall studs are typically horizontally spaced on 16" centers. Thus, the fibrous insulation is interrupted every 16" by 1¾" of wood (the actual thickness of a 2"×4" stud)—a material having a much smaller thermal resistance than the insulation. The result of this unavoidable configuration is that the finished wall has a number of relative heat leaks built into it at the studs. Thus, the overall "R" value of the finished wall is at least somewhat less than the "R" value as measured through a wall section between a given pair of studs (which is the customary rating area of stud walls).

However, this insulation discontinuity problem is substantially overcome by using structural panels of the present invention to construct the wall. Since intermittent studs are eliminated, the side edges of adjacent panel cores may be positioned quite closely to each other to form a substantially continuous core of insulation across the entire width of the completed wall. Thus, unlike conventional stud walls, the "R" value of any section of the foil-faced urethane core and wire matrix wall is substantially the same as the "R" value of any other section.

The practicality of implementing urethane as the core material is greatly enhanced by the foil facing (which may be bonded to both sides of the filler members as indicated, or to only one side if desired). One of the problems encountered in using urethane in conventional foamed in place lattice and core panels is the tendency of the urethane to deteriorate (i.e., crumble) when exposed to light and air during extended storage periods. This problem is substantially eliminated by the protective layers of foil which shield the urethane core from such light and air during storage, leaving only its edges exposed.

In addition, the foil serves two other important functions. First, it forms reflective barriers to radiant heat transfer through the core, thereby further increasing its already high "R" value. Secondly, it adds two more layers of vapor impermeable material to the core.

Despite the fact that the foil-faced urethane sheet has been cut into many strips and, in effect, "reassembled" within a maze of lattice wires, the many adjacent foil strips (see FIG. 4) in the finished panel cooperate to form surprisingly continuous and substantially planar reconstructed front and rear core surfaces within such wires. The adjacent foil edges, which are indented only by the sinuous lattice wires which they circumscribe, are in nearly continuous contact along the length of the panel core due to the precise element alignment possible under the described construction method of the invention. This continuity of the foil surfaces in the assembled panel enhances all of the functions of the foil. It affords improved protection of the urethane foam deterioration. It enhances panel reflectivity, and it also enhances impermeability to moisture or vapor.

In the finished wall the sprayed on exterior layers of stucco, plaster, concrete or the like are held directly against the substantially continuous and planar foil surfaces, despite the smoothness and nonporosity of such surfaces, by the outwardly projecting side portions of the three-dimensional wire supporting matrix. The matrix thus solves a potentially difficult bonding problem in addition to holding the individual filler elements in their uniquely contiguous relationship as previously described.

Of course, the filler members may be made from many other precoated materials (such as polystyrene) having suitable properties of the type referred to herein. Thus, the filler members may be formed of any type of material, provided the material is softer than the wire of the lattice structures so that the latter may be partly embedded into the facing surfaces of the filler elements as previously described. Accordingly, precoated wood or composition wood may be also employed for the filler members, depending upon the particular application for the finished panel.

It will be readily understood that the particular configuration of lattice structure illustrated in the drawings is merely exemplary of many different types of substantially planar or nearly two-dimensional structures that may be employed. Thus, instead of a sinuous rod, there may be employed many configurations of separate rods connected to the side rods 40 and 42 which may have various angular relations to each other and to the side rods 40 and 42.

Although the illustrated panel configuration is preferred wherein the depth of the lattice structures is greater than the thickness of the filler elements so that the side portions of the lattice structures will extend beyond and are completely free of the filler elements, it will be readily appreciated that principles of the present invention may be employed in a reinforced panel wherein the depth of the lattice structures is equal to or less than the thickness of the filler elements so that the lattice structures are completely embedded in the filler element and only outer surfaces of the filler elements are visible at the common planar surface collectively formed by the several filler elements.

The described precoated core elements may also be employed in hollow core or offset core panels of the type described in my co-pending patent application for COMPOSITE STRUCTURAL PANEL WITH OFFSET CORE, Ser. No. 023,950, filed Mar. 26, 1979.

There has been described an improved reinforced panel structure having a multilayered, reflective core, and a method of manufacture which provides a strong, lightweight, economical panel having both the desirable properties of a selected filler and the structural integrity afforded by a rigid framework.

The foregoing detailed description is to be clearly understood as given by way of illustration and example only, the spirit and scope of this invention being limited solely by the appended claims.

What is claimed is:

1. A structural panel comprising:
   (a) a multilayered reflective core having opposite side surfaces and including:
      (1) a plurality of contiguous elongated filler members, mutually contiguous ones of said filler members having opposed surfaces pressed against one another in vapor tight face-to-face contact with each other and having opposite side surfaces extending from said opposed surfaces, and
      (2) a plurality of reflective vapor impervious membrane strips respectively fastened to and covering substantially the entire extent of one of said opposite side surfaces of respective ones of said filler members, mutually adjacent ones of said strips having lateral edges in edge-to-edge contact and collectively defining a substantially continuous reflective and vapor resistant layer on at least one of said side surfaces of said core;
   (b) a three-dimensional supporting matrix including:
      (1) a plurality of lattice structures, each being interposed between and pressed into adjacent edges of a pair of said reflective strips and a pair of said mutually opposed filler member surfaces, each of said lattice structures having opposite side portions projecting beyond said opposite side surfaces of said core, and
      (2) a plurality of transverse members extending across said filler members and across said core, each of said transverse members being fixed to at least a group of said projecting opposite side portions of said lattice structures to thereby hold said lattice structures and filler members pressed together in a unitary panel configuration.

2. The panel of claim 1 wherein said filler members are composed of solid expanded plastic and said lattice structures and transverse members are formed from wire.

3. The panel of claim 2 wherein said filler members are of an expanded urethane material and wherein said strips are of a metal foil material.

4. The panel of claim 1 wherein said strips define substantially continuous reflective and vapor resistant layers on both of said side surfaces of said core.

5. The panel of claim 1 wherein said filler members and lattice structures are substantially free of adhesive bonding except between said strips and said filler members.

6. The panel of claim 1 wherein mutually opposed surfaces of said filler members and mutually adjacent edges of said strips have grooves and indentations formed respectively therein by pressure of said lattice structures in a pattern corresponding to said lattice structures, said lattice structures being substantially completely embedded in mating grooves and indentations of adjacent filler elements and strip edges, respectively.

7. A reinforced panel comprising:
   (a) a plurality of laterally contiguous elongated filler members, each having opposite faces lying in first and second planes, respectively;
   (b) a plurality of reflective, vapor impervious membrane strips, each being fastened to and covering substantially the entire extent of one of said opposite faces of said filler members, mutually adjacent ones of said strips having lateral edges in edge-to-edge contact,
   said filler members and said strips collectively defining a multilayered substantially continuous reflective core of said panel having layers thereof extending parallel to said planes;
   (c) a plurality of lattice structures respectively interposed between elements of respective adjacent pairs of said filler members and strip side edges and pressed at least partly into laterally contiguous surfaces and side edges, respectively, of said adjacent filler members and strips to thereby form a laterally laminated panel assembly of alternate laminations of lattice structures and membrane-surfaced filler members;

said laterally contiguous surfaces including planar portions in face-to-face contact for a major part of the distance between said opposite faces; and (d) a plurality of cross members affixed to at least some of said lattice structures to hold said lattice structures and filler members in said laterally laminated panel.

8. The panel of claim 2 wherein said core has a pair of opposite outer layers defined by said strips, and an inner layer defined by said filler members.

9. The panel of claim 8 wherein said cross members are spaced outwardly of said outer layers, whereby said panel may be covered with a cement plaster in contact with said reflective membrane strips and fully embedding said cross members and portions of said lattice structures.

10. The panel of claim 8 wherein said inner layer is of an expanded urethane material and where said outer layers are of a metal foil material.

11. The method of making a reinforced panel having a multilayered reflective core, said method comprising the steps of:

(a) forming a sheet of expanded plastic;
(b) adhering a reflective, vapor impervious membrane to a side surface of said sheet to form a laminated sheet;
(c) cutting said laminated sheet into a plurality of elongated filler elements, each having a longitudinally extending face defined by a portion of said membrane, and a pair of opposite lateral surfaces extending from side edges of said membrane portion;
(d) forming a plurality of lattice structures;
(e) arranging said elements and lattice structures in an interdigitated stack wherein said elements and lattice structures are in consecutive alternation and wherein said faces of said elements are substantially coplanar;
(f) laterally compressing said stack to force adjacent ones of said element lateral surfaces into intimate, vapor proof contact with each other and to bring adjacent side edges of said membrane portions into close edge-to-edge, coplanar juxtaposition, with said lattice structures being at least partially embedded in adjacent ones of said elements, thereby forming said multilayered core; and
(g) fixedly securing said lattice structures to one another while said stack is in its compressed condition.

12. The method of claim 11 wherein said step (a) is performed by forming a sheet of expanded urethane insulating material, and wherein said step (b) is performed by adhering a sheet of metal foil to a side surface of said urethane sheet.

13. The method of claim 12 wherein said step (b) further comprises adhering a sheet of metal foil to the opposite side surface of said urethane sheet before cutting said laminated sheet.

14. The method of claim 11 wherein said step (c) is performed by simultaneously cutting each of said elements from said laminated sheet with a multibladed saw.

15. A reinforced panel made by the method of claim 11.

* * * * *